United States Patent Office 3,489,179
Patented Jan. 13, 1970

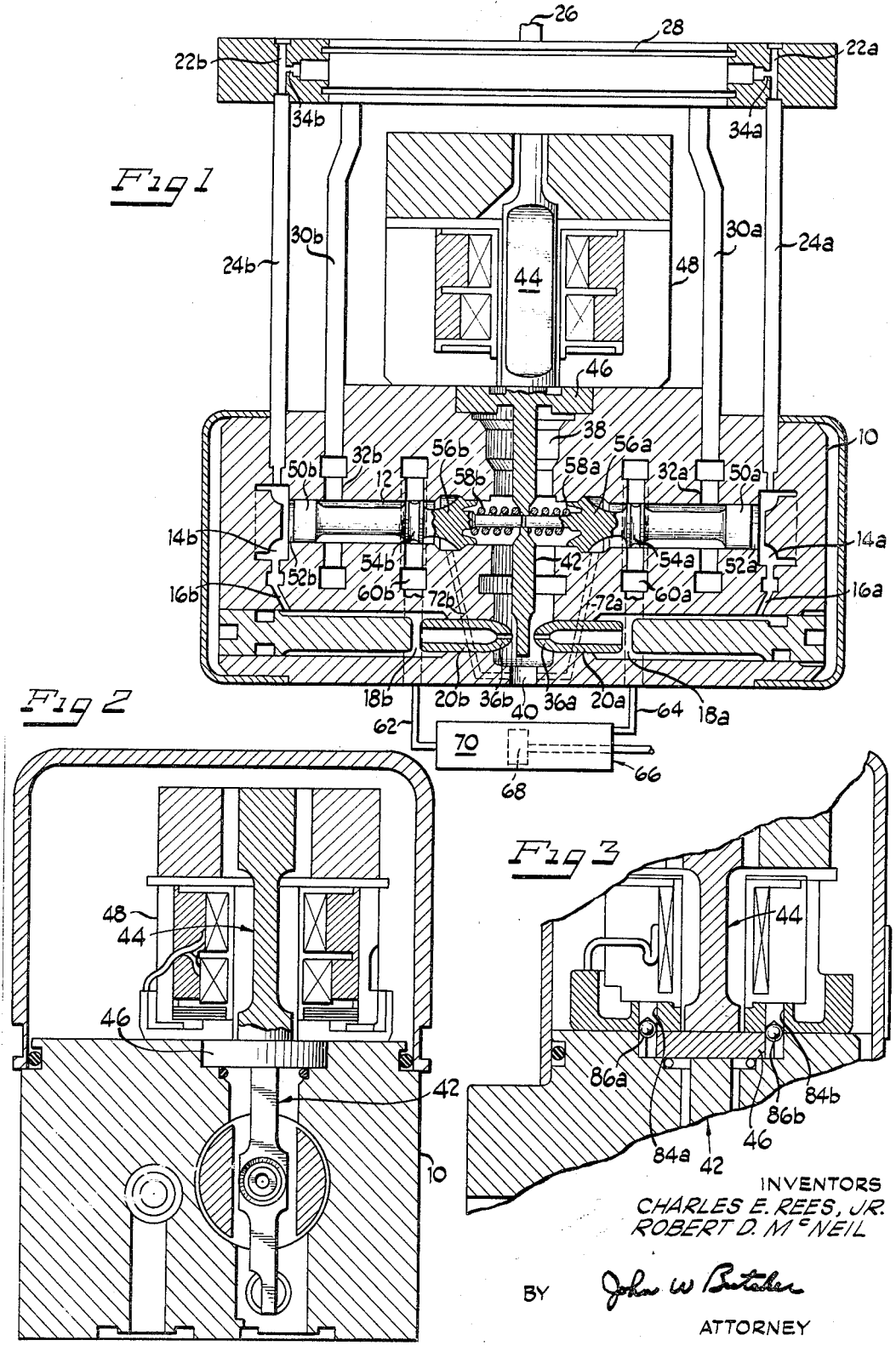

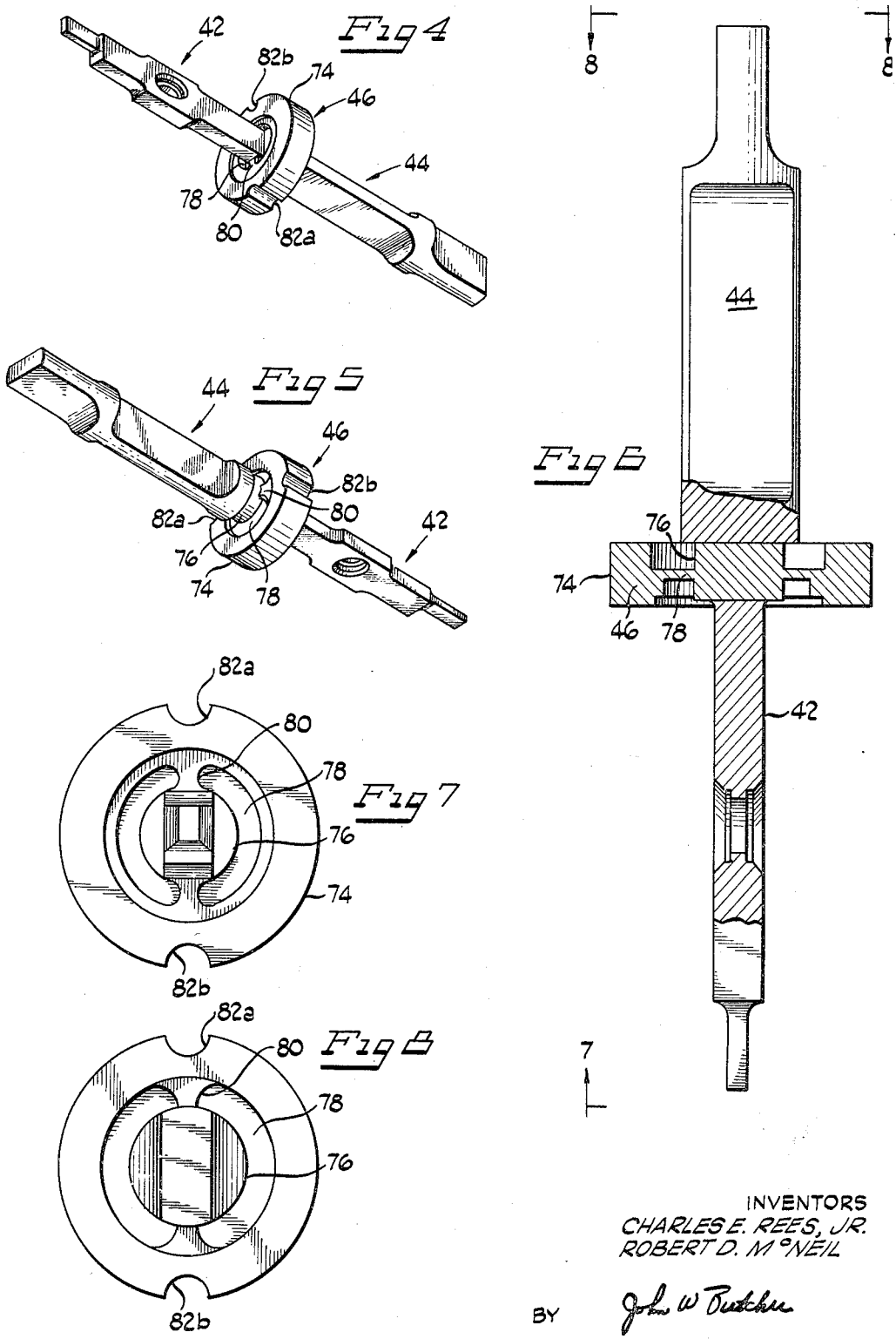

3,489,179
ELECTRO-HYDRAULIC SERVO VALVE
Robert D. McNeil, Granada Hills, and Charles E. Rees, Jr., Glendale, Calif., assignors, by mesne assignments, to Borg-Warner Corporation, Chicago, Ill., a corporation of Delaware
Continuation of application Ser. No. 590,770, Oct. 31, 1966. This application Dec. 16, 1968, Ser. No. 785,445
Int. Cl. F17d 3/00
U.S. Cl. 137—625.62                                  4 Claims

ABSTRACT OF THE DISCLOSURE

An electro-hydraulic servo valve including a seal separating the electrical section from the hydraulic fluid. The seal includes an outer diaphragm supporting portion, a diaphragm section and an inner diaphragm supporting portion and a torsion bar extending between the inner and outer diaphragm supporting portions. Means formed in the outer diaphragm supporting portion cooperate with the body of the servo valve to insure proper orientation of the servo valve components.

---

This application is a continuation of application Ser. No. 590,770, now abandoned.

This invention relates to electro-hydraulic servo valves and more particularly electro-hydraulic servo valves of the type wherein at least a part of the electrical section is isolated from the hydraulic fluid controlled by the hydraulic section.

Various seal means have been used in electro-hydraulic servo valves to isolate the electrical section from the hydraulic fluid in the hydraulic section. For example United States Patent 2,936,783 Moffatt, discloses a diaphragm seal; United States Patent 2,931,343, Moog, discloses a flexure tube seal, United States Patent 2,824,574, Place, discloses an isolating tube seal in combination with a resilient section in the armature, and United States Patent 3,117,585, Gerwig et al., discloses a torque tube seal.

The above-mentioned seal means normally are formed from metallic material so that the seal will withstand the high differential pressure experienced between the hydraulic section and the electrical section. These metallic seal members normally deflect to allow for movement of the armature and/or flapper member and thus the resiliency function induced by the metallic seal member into the operating parameters of the servo-valve becomes an important factor in the response characteristic of the servo valve assembly.

Each of the above-mentioned seal means is subject to undesirable operational characteristics. The diaphragm seal exhibits a complex non-linear load vs. deflection curve which is further adversely influenced by fluctuating operating pressures of the hydraulic system. The flexure tube seal is more expensive than the diaphragm seal and also exhibits an undesirable load vs. deflection curve. The isolating tube seal imposes severe design limitation on the armature portion of the electrical section of the assembly and thus is basically impractical for use with a sensitive and reliable electro-hydraulic servo valve assembly. The torque tube seal is more expensive to manufacture than the diaphragm seal and it requires relatively greater physical space in the valve assembly. All of the above seal means are difficult to calibrate to insure like response characteristics from valve to valve.

It is, therefore, an object of this invention to provide a seal means which exhibits a desirable load vs. deflection curve.

It is a further object of this invention to provide a seal means which may be calibrated to give a predetermined response characteristic.

It is a still further object of the invention to provide a means to position the seal with respect to the body of the servo valve.

Briefly described, this invention relates to a seal means of a modified diaphragm design. The seal includes an outer diaphragm supporting portion, a diaphragm section and an inner diaphragm supporting portion which may include an end portion of the electrical section armature as well as an end portion of the hydraulic section flapper. A torsion bar section extends from the outer diaphragm supporting portion to the inner diaphragm supporting portion.

Other objects and features of the invention will be readily apparent to those skilled in the art from the specification and appended drawings illustrating certain preferred embodiments, in which:

FIGURE 1 is a schematic representation of the servo valve assembly of the present invention;

FIGURE 2 is an end view, partially in cross-section, of a servo valve assembly taken generally along the mid-section of the servo valve assembly;

FIGURE 3 is a partial side view, partially in cross-section, of the seal assembly portion of the servo valve taken generally along the mid-section of the servo valve;

FIGURE 4 is a perspective view of the armature-flapper and associated seal means assembly of the servo valve;

FIGURE 5 is another perspective view of the assembly illustrated in FIGURE 4;

FIGURE 6 is a side view, partially in cross-section, of the assembly illustrated in FIGURES 4 and 5;

FIGURE 7 is a view of one of the apparatus illustrated in FIGURE 6; and

FIGURE 8 is a view of the other end of the apparatus illustrated in FIGURE 6.

Referring now to the drawing and more particularly, FIGURES 1–3, there is disclosed a body indicated in general by numeral 10. An elongated passage 12 is formed in the body portion 10. Passages 14a, 14b, 16a, 16b, 18a and 18b communicate with opposite ends of the opening 12 and the interior of nozzles 20a and 20b. The passages are provided with fluid from passages 22a, 22b by way of low pressure lines 24a and 24 b.

A high pressure port 26 supplies fluid to a filter assembly 28. The pressure of fluid supplied to this port 26 under normal operating conditions may be, for example, in the order of 3,000 p.s.i. Fluid at substantially this pressure is, therefore, supplied through the high pressure passages 30a and 30b to chambers 32a and 32b which are in communication with the central opening 12. Orifice means 34a and 34b provide a restriction and resultant decrease in the pressure of fluid in low pressure lines 24a and 24b and high pressure lines 30a and 30b. The pressure in low pressure lines 24a and 24b may be, for example, in the order of 300–700 p.s.i. Nozzles 20a and 20b have ends 36a and 36b which extend into a central vertical opening 38 formed in the body 10. The central vertical opening 38 is provided with a return line 40 which is in communication with the hydraulic system sump. Thus, the vertical opening 38 serves as a return sump.

Disposed within the vertical opening 38 is an elongated flapper 42. The flapper 42 has one end portion disposed between the nozzle ends 36a and 36b, the spacing being such that when the flapper 42 is moved toward one of these nozzle ends, the flow of fluid therethrough is progressively restricted while the flow of the fluid through the opposite nozzle end is progressively increased. The opposite end of flapper 42 is integrally connected to an armature 44 of an electromagnetic material. Integral with the flapper 42/armature 44 unit is a flexible diaphragm seal 46. The seal 46 is generally circular in configuration and functions to isolate the armature 44 from fluid in the opening 38.

The armature 44 is part of an electromagnetic torque motor designated generally as 48.

The elongated passage 12 is provided with a shuttle assembly comprising two identical shuttle halves 50a and 50b which are symmetrically arranged with respect to the flapper 42. Shuttle half 50a includes spaced lands 52a and 54a and a flow shield 56a. Similarly, shuttle half 50b includes spaced lands 52b and 54b and a flow shield 56b.

When the device is in operation, fluid in body passages 14a and 14b forces the shuttles 50a and 50b inward in a direction toward the flapper 42. Disposed between the flapper and flow shield 56a is a spring 58a. Similarly, disposed between the flapper 42 and flow shield 56b is a spring 58b. In the illustrated position of the shuttles 50a and 50b, the lands 54a and 54b on the shuttles prevent fluid flow between the openings 60a and 60b and the fluid passages 62 and 64 which serve as utilization ports for the actuator 66 which is schematically illustrated as double acting piston 68 within a cylinder 70.

Return fluid passage 72a connects the return port 40 with a portion of the opening 12 which is between land 54a and shield 56a. Similarly, return passage 72b connects the return port 40 with a portion of the opening 12 which is between land 54b and shield 56b.

Operation

As previously indicated, when high pressure fluid is supplied to the port 26, it is filtered by way of filter element 28 and passes through high pressure passages 30a and 30b to passage 12 filling the space between lands 52a and 54a on shuttle 50a and filling the space between lands 52b and 54b on shuttle 50b. Filtered low pressure fluid is supplied to the low pressure lines 24a and 24b; this fluid enters the end portions of the elongated opening 12 by way of body passages 14a, 14b and 16a, 16b forcing the shuttles 50a and 50b toward said flapper as previously indicated against the biasing of springs 58a and 58b. This lower pressure fluid also flows through body passages 18a and 18b into and through nozzles 20a and 20b where it impinges upon the flapper 42, then flowing through return port 40.

If a differential control current flows through the electromagnetic device 48, the armature 44 will be moved either in a clockwise or counter-clockwise direction. Assuming the armature 44 is moved in a counter-clockwise direction, the flexible seal 46 will permit flapper 42 to be moved in such a direction that the end portion thereof approaches the end 36a of the nozzle 20a. As the flapper approaches the nozzle, fluid flow therethrough is progressively inhibited. Simultaneously, the flow of fluid through nozzle 20b becomes progressively less inhibited. As a result, the fluid pressure in passage 14a will increase while the pressure in passage 14b will decrease. The shuttle means will be moved toward the left as viewed in FIGURE 1. Movement of the shuttle means 50a and 50b to the left in combination with the action of the springs 58a and 58b effects a linear increase in the force on the flapper 42 tending to return it to its neutral position. This, in effect, acts as a mechanical feedback force in opposition to the deflection of the flapper 42 induced by the torque motor 48. Movement of the shuttle means 50a and 50b increases the feedback force on the flapper 42 until the flapper 42 is returned to nearly its neutral position and will reman offset from the neutral position only a sufficient amount to compress the feedback springs 58a and 58b. As the shuttles 50a and 50b are displaced toward the left, the high pressure fluid in opening 12 will be directed into fluid passage 64 and thus routed to the right end of the actuator 66. Fluid in the left end of the actuator 66 is routed through fluid passage 62 into the central opening 12 and to return line 40.

The shuttle means 50a and 50b will be displaced to the degree required by the torque motor. The fluid pressures in the end portions of the elongated opening 12 on opposite ends of the shuttles 50a and 50b are substantially equalized when the flapper 42 is returned to its neutral position. When the flapper 42 is returned to its almost-neutral position described above, the shuttle means 50a and 50b will remain in this displaced position until the differential current supplied to the torque motor 48 effects opposite movement of flapper 42 at which time shuttle means 50a and 50b will be returned to the position illustrated or some other position, as described. It is thus readily apparent that the shuttle means 50a and 50b may be positioned at any desired position within the elongated opening 12.

Operation of the device has been illustrated as being in response to a counter-clockwise movement of the armature 44; however, the operation of the device as the flapper 42 is moved in a clockwise direction will be readily apparent to those skilled in the art.

The seal assembly of the present invention provides a means to support the armature-flapper member with respect to the body of the servo valve such that the armature-flapper is adapted to pivot with respect to the body portion. The seal assembly further isolates the hydraulic fluid within the servo valve body from the electromagnetic torque motor portion of the servo valve.

The seal assembly comprises an outer diaphragm supporting portion 74, an inner diaphragm supporting portion 76, and a diaphragm section 78 which extends from the inner diaphragm supporting portion 76 to the outer diaphragm supporting portion 74. The diaphragm section 78 includes a torsion bar section 80 which is preferably integral therewith. The torsion bar section extends from one edge of the outer diaphragm supporting portion 74 to the inner diaphragm supporting portion 76 and from the inner diaphragm supporting portion 76 to the outer diaphragm supporting portion 74. Thus, the two portions of the torsion bar section are aligned with each other and are at the mid-portion of the annular seal means.

The seal assembly provides a means of isolating the hydraulic fluid in the valve body from the armature portion of the servo valve assembly while minimizing the influence of fluctuating pressure of hydraulic fluid within the assembly. Additionally, the torsion bar section of the seal provides a resilience parameter in the operation of the flapper, the characteristics of which can be controlled and adjusted.

The diaphragm portion of the seal imparts a resilient function to the flapper; however, this resilient effect is negligible as compared with the resilient effect of the torsion bar section. Thus, varying the configuration of the torsion bar results in a corresponding change in the resilient operating parameter of the flapper.

The preferred embodiment of the seal means has been illustrated with the outer diaphragm supporting portion 74, the inner diaphragm supporting portion 76, diaphragm section 78 and torsion bar section 80 being formed as an integral unit. The torsion bar section 80 has been illustrated as being integral with the diaphragm section 78 and extending on both sides of the diaphragm section 78. Although this is the preferred arrangement, it is to be understood that the torsion bar section 80 need not extend on both sides of the diaphragm section 78. The torsion bar section preferably defines the pivotal axis of the flapper member.

A means is provided to orient the flapper and the seal assembly with respect to the body of the valve. This means comprises grooves 82a and 82b formed in the periphery of the seal, grooves 84a and 84b formed in the armature support housing, and balls 86a and 86b which fit between the grooves in the armature housing and the grooves in the seal.

As illustrated in FIGURE 3, the balls 86a and 86b engage the valve body 10, the outer diaphragm supporting portions 74 of the diaphragm, and the electro-magnetic torque motor armature portion to effect orientation of all three components. These separate elements are locked in metal-to-metal engagement by the balls 86a and 86b.

Referring particularly to FIGURES 3, 7, and 8, it is readily apparent that the grooves 84a and 84b are defined entirely by the armature portion of the electro-magnetic torque motor and that the grooves 82a and 82b are formed partially by the semi-cylindrical cut outs formed in the outer periphery of the outer diaphragm supporting portion 74 and partially by the valve body 10. Disposition of the balls 86a and 86b within the grooves at assembly provides accurate orientation of the separate elements and insures retention of the positioned relationships during operation.

It is also important to note that the orientation of elements is accomplished along the pivotal axis of the flapper. As shown, the portions of the grooves 84a and 84b formed in the outer diaphragm portion 74 are disposed in alignment with the torsion bar section 80 which defines the pivotal axis of the flapper. The interengagement of the grooves and balls establishes the orientation of the valve components along this pivotal axis. Movement or shifting of elements or changes in the relationship between the flapper and other valve components such as the nozzles is entirely symmetrical precluding the possibility of non-linear performance. This is particularly important in that influence of operating conditions such as temperature and associated expansion characteristics of the various separate elements are minimized.

What is claimed is:

1. A servo valve comprising a body having an elongated cylindrical opening therein, a shuttle assembly reciprocally mounted within said elongated cylindrical opening, a central opening in said body intersecting said elongated cylindrical opening providing an opening from said elongated cylindrical opening to the exterior of said body, passage means and nozzle means disposed in said body, said nozzle means extending into said central opening and being disposed in aligned spaced apart relation, an elongated flapper disposed in said central opening and oriented intermediate said nozzles in spaced relation to each said nozzle, said flapper being pivotally supported in said body to move toward and away from each said nozzle to provide a motive force to shift said shuttle assembly with respect to said elongated cylindrical opening, an electro-magnetic torque motor secured to said body including an armature connected to said elongated flapper to cause pivotal movement in response to activation of said torque motor, seal means pivotally supporting said flapper with respect to said body, said seal means including diaphragm means extending between said flapper and said body, a torsion bar section integrally formed with said diaphragm means and disposed on the pivotal axis of said flapper and means to orient said flapper and seal means with respect to said nozzles including at least one groove formed in said diaphragm means, at least one groove formed in said body and at least one groove formed in said electro-magnetic torque motor and a ball disposed in said grooves engaging said body, said diaphragm means and said electro-magnetic torque motor, connection of said torque motor to said body retaining said balls in said grooves to retain said flapper and said diaphragm means in said oriented position.

2. An electro-hydraulic servo valve as claimed in claim 1 wherein said diaphragm means includes an outer diaphragm supporting portion supported by said body, an inner diaphragm supporting portion connected to said flapper and a flexible diaphragm extending therebetween, said torsion bar being formed on said flexible diaphragm, and said grooves in said diaphragm means being formed in said outer diaphragm supporting portion at the outer periphery thereof.

3. An electro-hydraulic servo valve as claimed in claim 2 wherein said flapper, said inner diaphragm supporting portion, said outer diaphragm supporting portion said flexible diaphragm and said torsion bare are integrally formed.

4. An electro-hydraulic servo valve as claimed in claim 2 wherein said grooves in said outer diaphragm supporting portion are disposed upon the pivotal axis of said flapper and said grooves in said body, said diaphragm means and said electro-magnetic torque motor are disposed upon the transverse axis of said servo valve intermediate said nozzles.

References Cited

UNITED STATES PATENTS

| 2,203,219 | 6/1940 | Jackman | 151—57 |
| 2,977,985 | 4/1961 | Ericson et al. | 137—625.61 |
| 3,223,104 | 12/1965 | Cox et al. | 137—625.62 XR |

HENRY T. KLINKSIEK, Primary Examiner